(12) United States Patent
Goel et al.

(10) Patent No.: US 11,122,577 B2
(45) Date of Patent: Sep. 14, 2021

(54) INITIAL ACQUISITION

(71) Applicant: QUALCOMM Incorporated, San Diego, CA (US)

(72) Inventors: Satashu Goel, San Diego, CA (US); Arvind Vardarajan Santhanam, San Diego, CA (US); Yongle Wu, San Diego, CA (US); Daniel Amerga, San Diego, CA (US); Sindhu Satyan, San Diego, CA (US); Danyang Cong, San Diego, CA (US); Sunitha Sundaram, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 97 days.

(21) Appl. No.: 16/370,704

(22) Filed: Mar. 29, 2019

(65) Prior Publication Data

US 2020/0314861 A1 Oct. 1, 2020

(51) Int. Cl.
*H04W 72/06* (2009.01)
*H04W 40/24* (2009.01)
(Continued)

(52) U.S. Cl.
CPC ......... *H04W 72/06* (2013.01); *H04W 40/246* (2013.01); *H04W 56/0005* (2013.01); *H04W 72/0453* (2013.01); *H04W 72/10* (2013.01)

(58) Field of Classification Search
None
See application file for complete search history.

(56) References Cited

U.S. PATENT DOCUMENTS

2019/0159261 A1* 5/2019 Jung ................ H04W 74/0891
2019/0182716 A1* 6/2019 Futaki ................ H04W 80/02
(Continued)

FOREIGN PATENT DOCUMENTS

WO WO-2018204260 A1 11/2018

OTHER PUBLICATIONS

Huawei, et al., "Remaining Details of NR PBCH Design", 3GPP Draft, 3GPP TSG RAN WG1 Meeting #92bis, R1-1803626, 3rd Generation Partnership Project (3GPP), Mobile Competence Centre, 650, Route Des Lucioles, F-06921 Sophia-Antipolis Cedex, vol. RAN WG1, No. Sanya, China, Apr. 16, 2018-Apr. 20, 2018, Apr. 15, 2018 (Apr. 15, 2018), XP051425923, pp. 1-3, URL: http://www.3gpp.org/ftp/Meetings%5F3GPP%5FSYNC/RAN1/Docs/, [retrieved on Apr. 15, 2018], p. 2, line 5-line 19.

(Continued)

*Primary Examiner* — Lonnie V Sweet
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may receive a synchronization signal block associated with a first channel number as part of a scan, wherein the synchronization signal block indicates a second channel number corresponding to a cell-defining synchronization signal block. The UE may attempt acquisition for the cell-defining synchronization signal block at an elevated priority level based at least in part on the synchronization signal block indicating the second channel number. Numerous other aspects are provided.

30 Claims, 9 Drawing Sheets

(51) Int. Cl.
*H04W 56/00* (2009.01)
*H04W 72/04* (2009.01)
*H04W 72/10* (2009.01)

(56) References Cited

U.S. PATENT DOCUMENTS

2019/0222340 A1* 7/2019 Kaikkonen .......... H04J 11/0073
2020/0163052 A1* 5/2020 Ko .................... H04J 11/0069
2020/0196254 A1* 6/2020 Kerhuel ............... H04L 5/0048

OTHER PUBLICATIONS

International Search Report and Written Opinion—PCT/US2020/024870—ISAEPO—dated Jun. 17, 2020.
Mediatek Inc: "Remaining Issues for NR-PBCH", 3GPP Draft, 3GPP TSG RAN WG1 Meeting #92, R1-1801641_Remaining Issues for NR-PBCH, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397642, 3 Pages, Retrieved from the Internet: URL: http://www.3gpp.org/ftp/tsg%5Fran/WG1%5FRL1/TSGR1%5F92/Docs/, [retrieved on Feb. 17, 2018], p. 2, line 16-line 28.
ZTE Corporation, et al., "Consideration on Report CGI Measurement", 3GPP Draft, 3GPP TSG-RAN WG2 Meeting #101, R2-1802024 Consideration on Report CGI Measurement, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018 (Feb. 15, 2018), XP051399794, 3 Pages, Retrieved from the Internet: URL: http://www.3gpp.org/ftp/tsg%5Fran/WG2%5FRL2/TSGR2%5F101/Docs/, [retrieved on Feb. 15, 2018], p. 2, line 22-line 32.

* cited by examiner

INITIAL ACQUISITION

FIELD OF THE DISCLOSURE

Aspects of the present disclosure generally relate to wireless communication, and more particularly to techniques and apparatuses for initial acquisition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a synchronization signal block associated with a first channel number as part of a scan, wherein the synchronization signal block indicates a second channel number corresponding to a cell-defining synchronization signal block; and attempting acquisition for the cell-defining synchronization signal block at an elevated priority level based at least in part on the synchronization signal block indicating the second channel number.

In some aspects, a UE for wireless communication may include memory and one or more processors operatively coupled to the memory. The memory and the one or more processors may be configured to receive a synchronization signal block associated with a first channel number as part of a scan, wherein the synchronization signal block indicates a second channel number corresponding to a cell-defining synchronization signal block; and attempt acquisition for the cell-defining synchronization signal block at an elevated priority level based at least in part on the synchronization signal block indicating the second channel number.

In some aspects, an apparatus for wireless communication may include means for receiving a synchronization signal block associated with a first channel number as part of a scan, wherein the synchronization signal block indicates a second channel number corresponding to a cell-defining synchronization signal block; and means for attempting acquisition for the cell-defining synchronization signal block at an elevated priority level based at least in part on the synchronization signal block indicating the second channel number.

In some aspects, a non-transitory computer-readable medium may store one or more instructions for wireless communication. The one or more instructions, when executed by one or more processors of a UE, may cause the one or more processors to: receive a synchronization signal block associated with a first channel number as part of a scan, wherein the synchronization signal block indicates a second channel number corresponding to a cell-defining synchronization signal block; and attempt acquisition for the cell-defining synchronization signal block at an elevated priority level based at least in part on the synchronization signal block indicating the second channel number.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
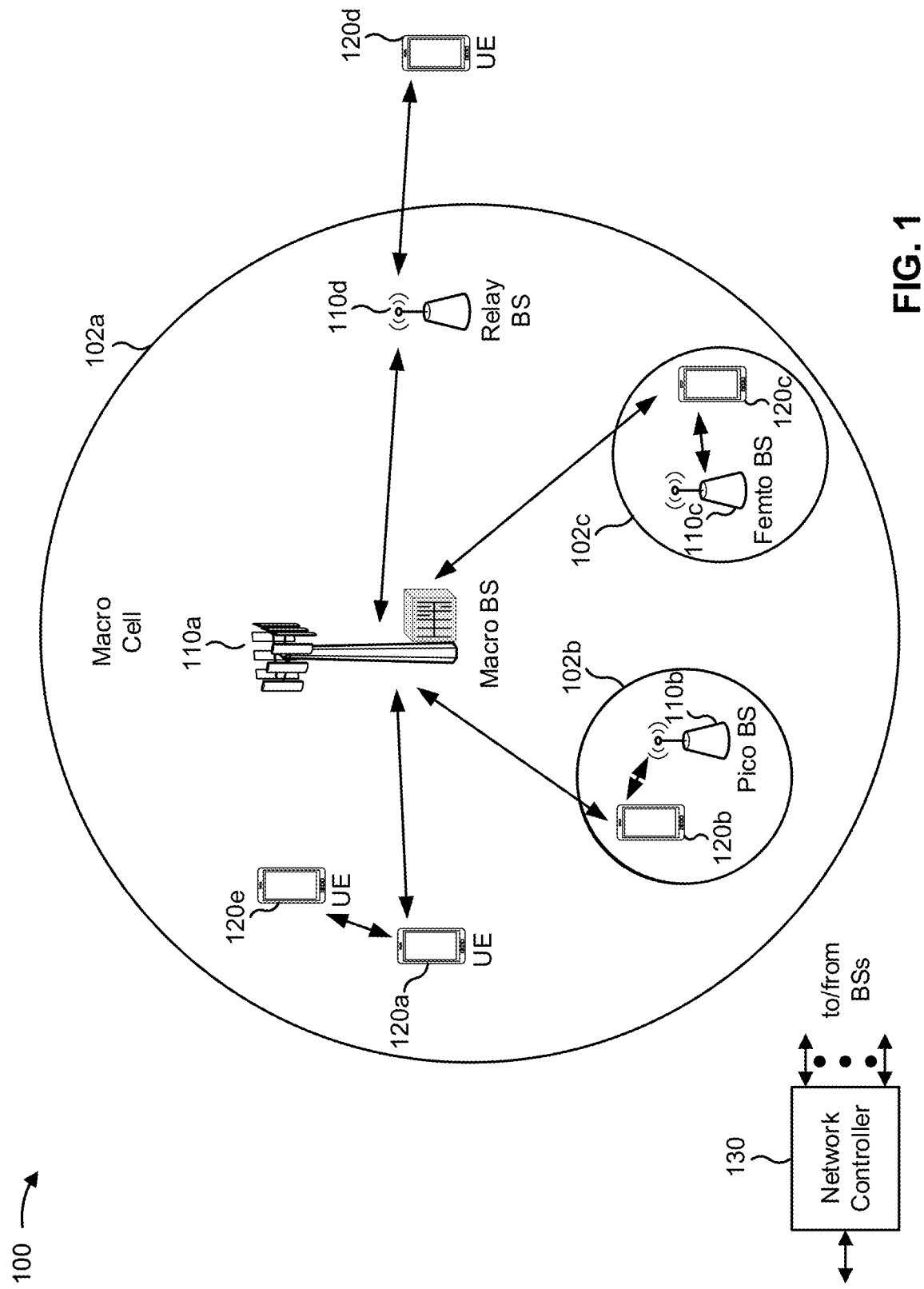
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
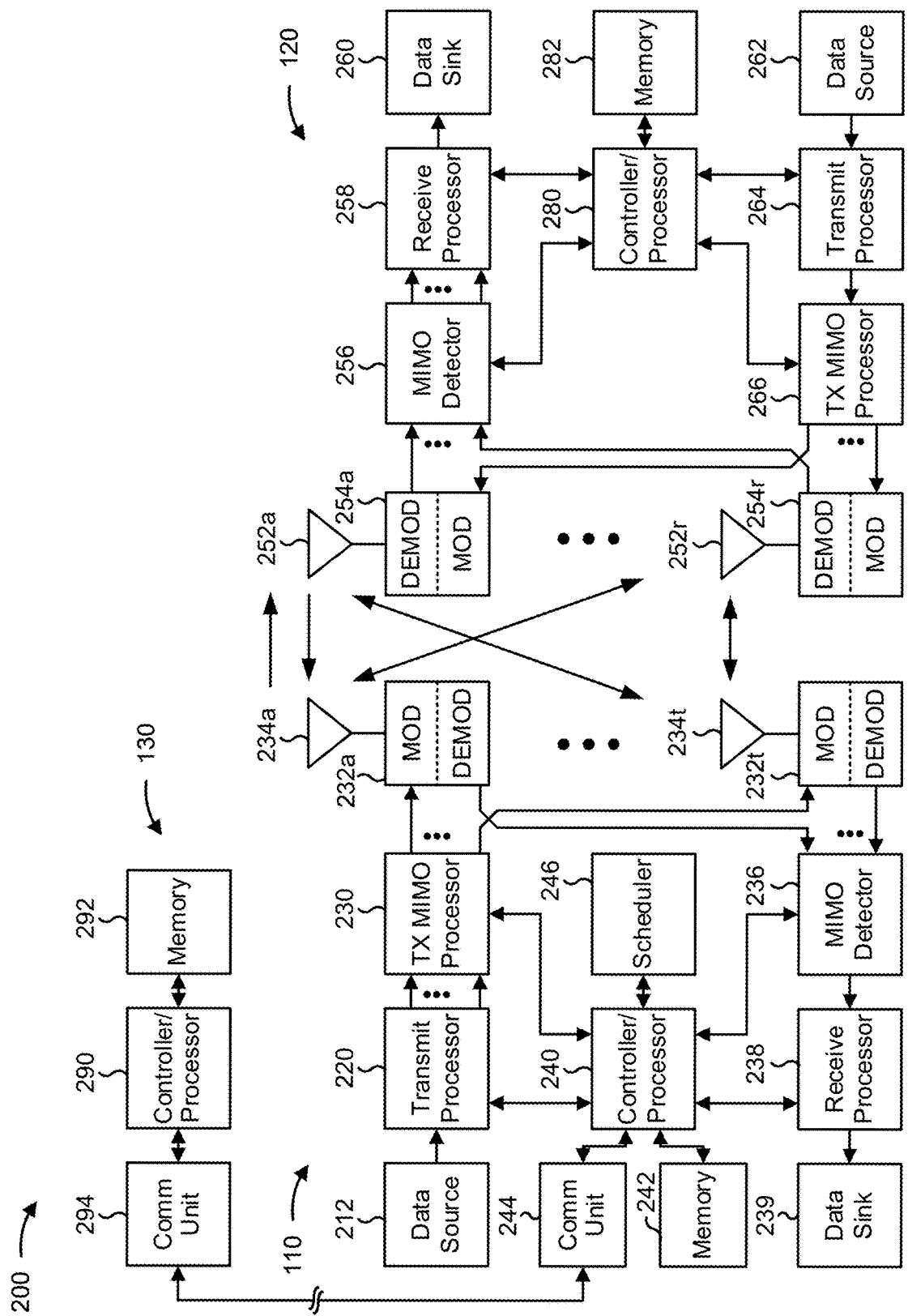
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cell selection and/or acquisition, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a synchronization signal block associated with a first channel number as part of a scan, wherein the synchronization signal block indicates a second channel number corresponding to a cell-defining synchronization signal block; means for attempting acquisition for the cell-defining synchronization signal block at an elevated priority level based at least in part on the synchronization signal block indicating the second channel number; means for selectively continuing the scan at a next channel number after the first channel number, or at a next channel number after the second channel number, based at least in part on a timer; means for selectively continuing the scan at a next channel number after the first channel number, or at a next channel number after the second channel number, based at least in part on a number of scans performed since a previous scan was continued from a channel number associated with another cell-defining synchronization signal block; means for determining that the acquisition is to be attempted at the elevated priority level; means for determining, after a threshold number of attempts, that the cell-defining synchronization signal block is not acquired at the second channel number; means for attempting the acquisition for one or more channel numbers between the first channel number and the second channel number based at least in part on determining that the cell-defining synchronization signal block is not received at the second channel number after the threshold number of attempts; means for acquiring the cell-defining synchronization signal block at a channel other than one associated with the second channel number; means for identifying a network misconfiguration based at least in part on acquiring the cell-defining synchronization signal block at the channel other than the one associated with the second channel number; means for receiving information identifying another channel number associated with another cell-defining synchronization signal block; means for determining that acquisition of the other cell-defining synchronization signal block is not to be prioritized based at least in part on the network misconfiguration; means for performing the scan for a New Radio (NR) radio access technology (RAT); means for performing a scan for another RAT, other than the NR RAT, during the scan for the NR RAT; means for performing the scan for an NR RAT, wherein a frequency range associated with another RAT other than the NR RAT is skipped during the scan; means for performing the scan for multiple channel numbers in parallel; means for performing the scan based at least in part on a scanning order, wherein the scanning order is based at least in part on a previous scan or frequencies to be scanned as part of the scan; and/or the like. In some aspects, such means may include one or more components of UE 120 described in connection with FIG. 2.

As indicated above, FIG. 2 is provided as an example. Other examples may differ from what is described with regard to FIG. 2.

A UE may perform a scan in order to identify a suitable cell for the UE. For example, the UE may perform the scan to identify a cell on which the UE is to camp. When performing a scan, a UE may scan for synchronization signal blocks (SSBs) on a series of channels that may be represented by channel numbers, such as Global Synchronization Channel Numbers (GSCNs). The scan may include a band scan, a frequency scan, and/or the like.

As wireless technologies advance, the bandwidth of bands to be scanned may increase. As one example, some bands in 5G/NR are associated with large bandwidths (e.g., the n77 band may have a bandwidth of 900 MHz). Furthermore, the signal structure for the 5G/NR RAT may lead to scanning being performed over all candidate frequencies of a band. This may significantly increase band scan times for 5G in comparison to some other RATs. Thus, camping of the UE may be delayed, which may negatively impact communication performance of the UE.

An SSB may specify the location of another SSB that defines a cell, which may be known as a cell-defining (CD) SSB. For example, the CD SSB may be located on a synchronization raster of the band, and may be identified by a channel number, such as a Global Synchronization Channel Number (GSCN) and/or the like. An SSB that does not define a cell may be referred to as a non-CD SSB.

When performing a scan, the UE may scan progressively from a lower frequency (e.g., channel, channel number, etc.) to a higher frequency. This may be referred to herein as a linear scan, a progressive scan, a linear progressive scan, and/or the like. However, due to the increasing bandwidth in 5G and similar RATs, a linear progressive scan may be inefficient and may significantly delay cell acquisition.

Some techniques and apparatuses described herein improve the acquisition of cells and/or the efficiency of scans (e.g., band scans, frequency scans, and/or the like). For example, some techniques and apparatuses described herein provide for the prioritization of scanning a CD SSB based at least in part on receiving information indicating the CD SSB. For example, a UE may skip to the CD SSB based at least in part on receiving information that identifies the CD SSB. In some cases, a network misconfiguration may mean that the CD SSB is not actually located at the channel indicated by the information that identifies the CD SSB. In such a case, the UE 120 may identify the network misconfiguration based at least in part on determining that the CD SSB is not located at the channel. In some cases, the UE 120 may perform an action based on identifying the network misconfiguration. For example, the UE 120 may determine not to follow the information that identifies the CD SSB during a subsequent scan, may scan surrounding channels, may resume a scan at a particular channel, may determine that information identifying another CD SSB is to be disregarded, and/or the like. Thus, impact of the network misconfiguration and latency associated with initial acquisition are reduced.

Furthermore, some techniques and apparatuses described herein may provide improved scanning efficiency based at least in part on scanning multiple channels in parallel, sorting bands for scanning, sorting frequencies for scanning, performing a multi-RAT scan, and/or the like. Thus, techniques and apparatuses described herein reduce latency associated with initial acquisition and provide graceful handling of network misconfigurations.

Figure 3A:
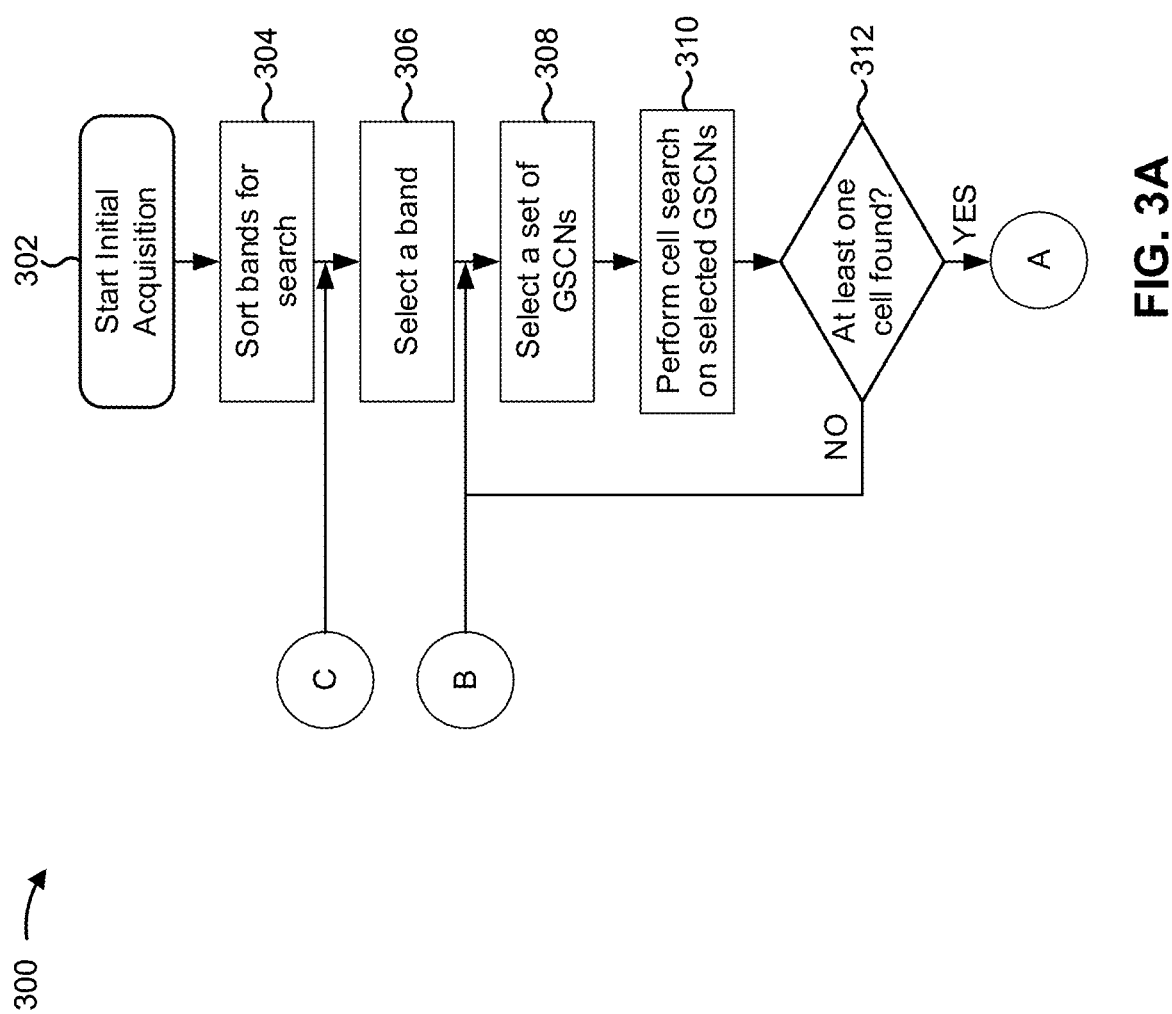
FIGS. 3A and 3B are diagrams illustrating examples of an initial acquisition procedure, in accordance with various aspects of the present disclosure.
Figure 3B:
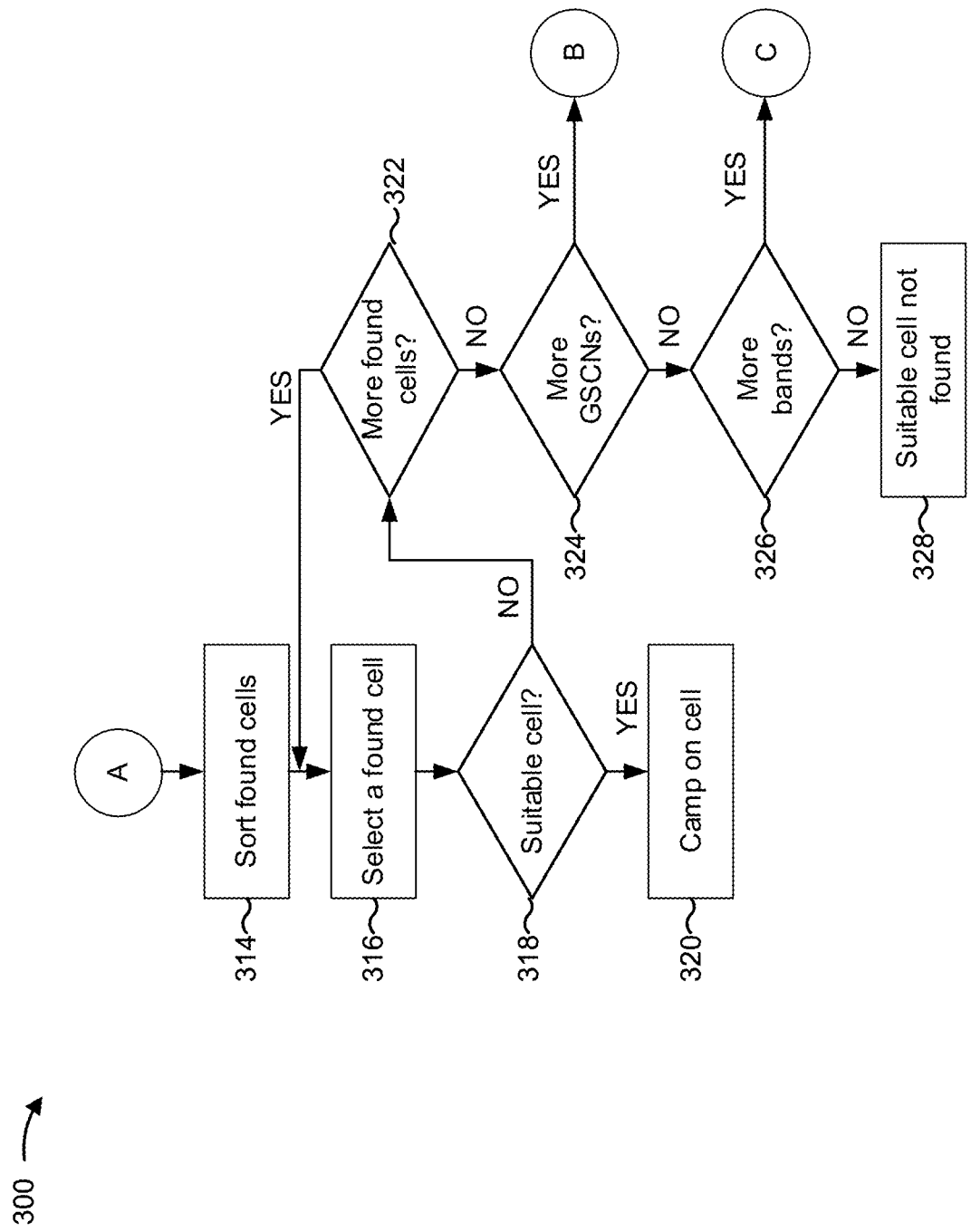

FIGS. 3A and 3B are diagrams illustrating examples 300 of an initial acquisition procedure, in accordance with various aspects of the present disclosure. In some aspects, the operations described in connection with FIGS. 3A and 3B may be performed to acquire a cell associated with a particular RAT, such as 5G/NR, although the techniques and apparatuses described herein are not limited to those involving 5G/NR and may be applied for other RATs. The operations described in connection with examples 300 may be performed by a UE (e.g., UE 120) in connection with a scan, such as a frequency scan, a band scan, and/or the like.

As shown in FIG. 3A, and by reference number 302, the UE 120 may start an initial acquisition procedure. As shown by reference number 304, the UE 120 may sort a set of bands to be searched. The set of bands may include bands associated with one or more RATs. For example, the set of bands may include one or more bands associated with 5G/NR (e.g., sub-6 GHz bands, high-frequency bands, and/or the like), one or more bands associated with 4G/LTE, or one or more bands associated with a different RAT. A band may include one or more channels, which may be associated with respective channel numbers, such as GSCNs and/or the like. The UE 120 may sort the set of bands to determine a scanning order.

In some aspects, the UE 120 may determine the scanning order (e.g., sort the set of bands) based at least in part on a rule. In some aspects, the rule may indicate that an NR band on which an NR system was previously identified is to be prioritized. In this case, the NR band may be sorted to a higher-priority position in the set of bands. Additionally, or alternatively, the rule may be based at least in part on a number of NR systems detected per band, a number of channels (e.g., channel numbers) that include at least one NR system per band, and/or the like. In some aspects, the rule may indicate that the bands are to be prioritized based at least in part on band frequency (e.g., a lower frequency band may be prioritized over a higher frequency band).

In some aspects, the UE 120 may perform a scan based at least in part on weighted scheduling of the bands (e.g., based at least in part on sorting the bands in accordance with a weighting technique). For example, bands associated with a higher priority level (e.g., using a prioritization technique such as the one described in connection with the rule described above) may be scanned more frequently than bands associated with a lower priority level. In such a case, the UE 120 may assign different scan rates to different bands in accordance with the weighted scheduling of the bands.

As a first example of the above prioritization and sorting of bands, Band n41 (2496-2690 MHz) can be prioritized over Band n78 (3300-3800 MHz) because Band n41 is a lower frequency band than Band n78. In this case, Band n41 may be scanned in every band scan, whereas Band n78 may be scanned in every third band scan. As a second example, Band n78 can be prioritized over Band n41 if an NR system was previously found in Band n78 and no NR system was found in Band n41. In some aspects, these rules or weighting techniques may be applied per geographical area, per time interval, and/or the like.

In some aspects, the UE 120 may sort frequencies (e.g., frequencies of a band) or channel numbers associated with the frequencies for a scan. For example, the frequencies may be based at least in part on frequencies where the UE 120 has previously detected an NR system, frequencies advertised by BS 110 (e.g., using a system information block (SIB)), frequencies specified by an upper layer (e.g., a high-level operating system, a configuration, etc.). In such a case, the UE 120 may sort frequencies based at least in part on recency (e.g., frequencies where an NR system was recently detected may be prioritized), a network-advertised frequency (e.g., frequencies advertised by BS 110 may be prioritized based at least in part on when the network-advertised frequency was identified using a SIB), geographical area (e.g., a frequency specified by an upper layer may be prioritized if the frequency is applicable to a geographical area of the UE 120, such as a current cell, a current tracking area identifier, a current routing area identifier, and/or the like), and/or the like.

As shown by reference number 306, the UE 120 may select a band to be searched. For example, the UE 120 may select the band to be searched based at least in part on the order in which the set of bands are sorted, as described above. As shown by reference number 308, the UE 120 may select a set of channel numbers (e.g., GSCNs and/or the like) of the band to be searched. For example, the UE 120 may select the set of channel numbers based at least in part on an order of the set of channel numbers (e.g., an ascending order, a descending order, an order based at least in part on sorting frequencies of the band, and/or the like) or another factor. In some aspects, the UE 120 may select the set of channel numbers and/or may determine an order of the set of channel numbers based at least in part on an SSB that points to a cell-defining SSB, as described in more detail in connection with FIGS. 5-7, below.

As shown by reference number 310, the UE 120 may perform a cell search with regard to the set of channel numbers. In some aspects, the UE 120 may search channels corresponding to the set of channel numbers sequentially. "Searching," "performing a search," and "scanning" may be used interchangeably herein. In some aspects, the UE 120 may search multiple channels in parallel. For example, the UE 120 may perform a search for two or more channels contemporaneously. In such a case, the two or more channels may be adjacent to each other, which may conserve radio frequency and/or baseband resources of the UE 120, or may not be adjacent to each other, which may improve efficiency of the search and provide more robust selection of channels to be searched. In some aspects, when searching a channel, the UE 120 may attempt acquisition of an SSB on the channel or may attempt acquisition of a cell identified by an SSB on the channel.

In some aspects, the UE 120 may search a set of channel numbers in parallel based at least in part on a radio frequency constraint of the UE 120. For example, assume that a set of GSCNs G1 through G8 are to be searched. Assume further that the UE 120 is capable of searching up to three GSCNs in parallel, and assume that G1 must be included in the search. In this case, the UE 120 may determine that G1 and G2 can be searched in parallel. In some cases, the UE may search up to 3 GSCNs based at least in part on the capability of the UE. In this case, if the candidate GSCNs are separated from each other, then the UE 120 may select fewer than 3 GSCNs (e.g., based at least in part on radio frequency constraints. Thus, scanning speed of the UE 120 may be improved.

When one or more cells are found on a channel associated with the set of channel numbers (block 312—YES), then the UE 120 may proceed to block A (shown in FIG. 3B). When no cell is found on a channel associated with the set of channel numbers (block 312—NO), then the UE 120 may return to block 308, and may select another set of GSCNs of the band to be scanned.

As shown in FIG. 3B, continuing from block A, the UE 120 may sort the one or more cells that are detected in the set of channel numbers. For example, the UE 120 may sort the one or more cells based at least in part on various criteria, such as signal strength, bandwidth, frequency, latency, and/or the like. As shown by reference number 316, the UE 120 may select a found cell of the one or more cells. For example, the UE 120 may select the found cell based at least in part on the sorting (e.g., may select a "best" cell of the one or more cells). If the found cell is a suitable cell for the UE (block 318—YES), then the UE 120 may camp on the found cell (block 320). For example, the UE 120 may determine that the found cell is a suitable cell based at least in part on one or more thresholds associated with the various criteria described above. If the found cell is not a suitable cell for the UE 120 (block 318—NO), and if there are more found cells other than the unsuitable found cell on the band (block 322—YES), then the UE 120 may return to block 316, and may determine whether another found cell is a suitable cell. If there are no more found cells (block 322—NO), then the UE 120 may determine whether more channel numbers (e.g., GSCNs and/or the like) of the band are to be scanned (block 324).

If there are more channel numbers of the band to be scanned other than the previously scanned channel numbers (block 324—YES), then the UE 120 may return to block B of FIG. 3A and may proceed accordingly. If there are no more channel numbers of the band to be scanned (block 324—NO), then the UE 120 may proceed to block 326.

If there are additional bands of the set of bands to be scanned (block 326—YES), then the UE 120 may return to block C of FIG. 3A and may proceed accordingly. If there are no more bands of the set of bands to be scanned (block 326—NO), then the UE 120 may determine that a suitable cell is not found. In other words, once the UE 120 has scanned all channel numbers of all bands of the set of bands, then the UE may determine that no suitable cell is found, and may not camp on a cell.

In some aspects, the UE 120 may perform the scan for a first RAT, and may interrupt the scan of the first RAT to perform a scan for a second RAT. For example, based at least in part on the occurrence of an event, the UE 120 may perform a scan for based at least in part on a list of frequencies that includes NR channels and channels of one or more other RATs (e.g., LTE, Global System for Mobile communications (GSM), wideband CDMA (WCDMA), etc.). In this case, the UE 120 may interrupt the scan on the NR channels to perform the scan on the channels of the one or more other RATs in connection with the event. The event may be based at least in part on, for example, the expiry of a timer, a change in UE location or UE mobility (e.g., based at least in part on a sensor), a size or bandwidth scanned since the NR band scan was last resumed or performed, and/or the like. Thus, the UE 120 may reduce scanning time in cases where no NR cell is present by intermittently performing non-NR scans.

In some aspects, the UE 120 may omit one or more frequencies or frequency ranges from a scan. For example, in some cases, a portion of a band associated with a first RAT (e.g., an NR band and/or the like) may have a deployment of a second RAT (e.g., LTE, WCDMA, etc.). Thus, in order to improve scanning time, the UE 120 may omit, from a scan of the first RAT, frequency ranges occupied by the second RAT. Similarly, when performing a scan of a band for the second RAT, the UE 120 may omit frequency ranges of the band that are occupied by the first RAT. In some aspects, the frequency range to be excluded may include a cell bandwidth for the first RAT or the second RAT. As another example, the UE 120 may exclude a frequency range for LTE during NR band scans, and vice-versa. More particularly, since the evolved-UTRA Absolute Radio Frequency Number (EARFCN) and bandwidth for an LTE cell are known, the frequency range spanned by the LTE cell can be excluded during a NR band scan. This reduces latency associated with the NR band scan. Further, UE 120 may exclude frequency range for forbidden PLMN (FPLMN) frequency range for NR during NR band scans.

As indicated above, FIGS. 3A and 3B are provided as one or more examples. Other examples may differ from what is described in connection with FIGS. 3A and 3B.

Figure 4:
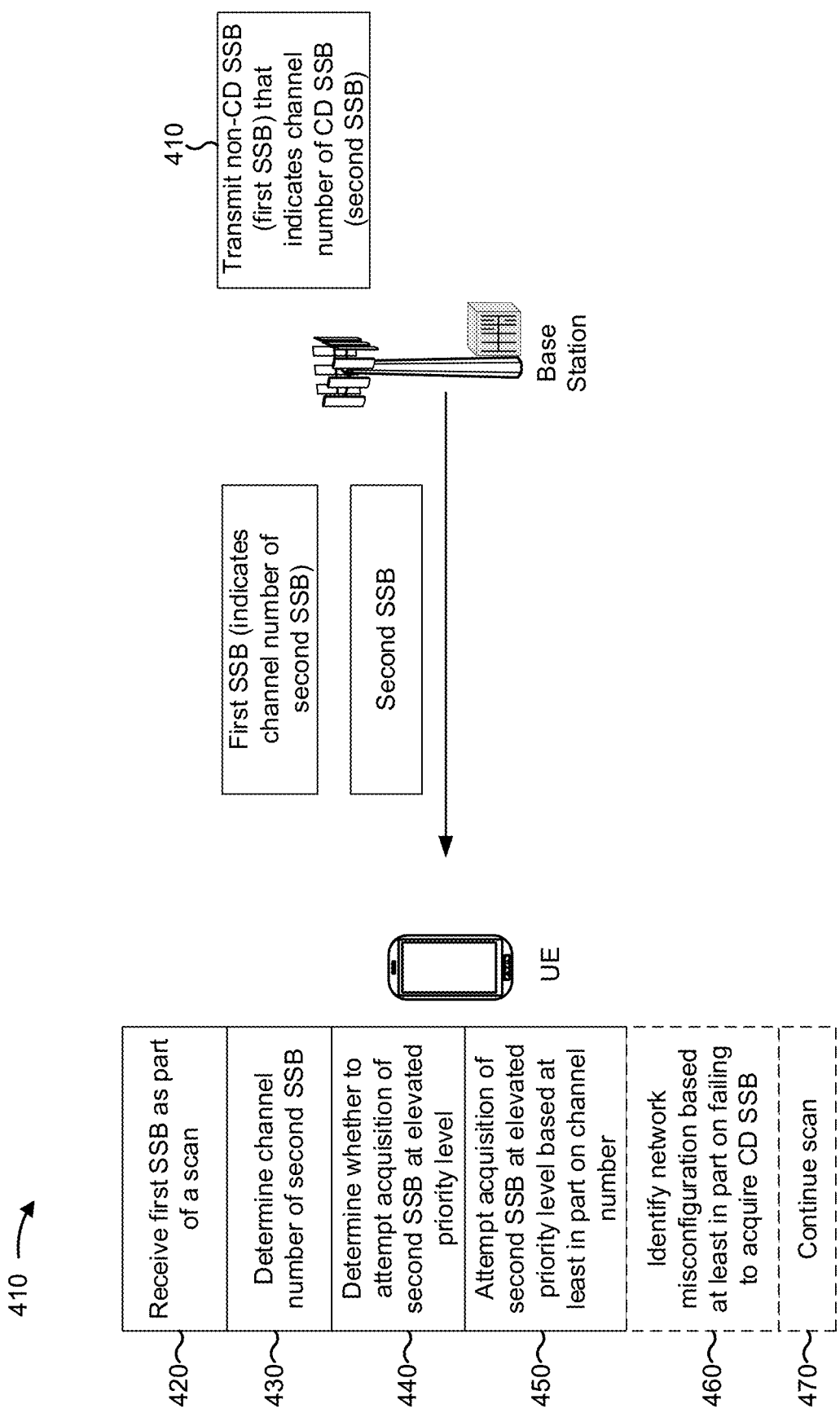
FIG. 4 is a diagram illustrating an example of attempting to acquire a cell-defining (CD) synchronization signal block (SSB) at an elevated priority level, in accordance with various aspects of the present disclosure.

FIG. 4 is a diagram illustrating an example 400 of attempting acquisition of a cell-defining (CD) synchronization signal block (SSB) at an elevated priority level, in accordance with various aspects of the present disclosure.

As shown in FIG. 4, and by reference number 410, a BS 110 may transmit a non-CD SSB, referred to as a first SSB. As further shown, the first SSB may indicate a channel number associated with a CD SSB, referred to as a second SSB. For example, the first SSB may include or be associated with information identifying the CD SSB. In some aspects, the information identifying the CD SSB may include, for example, information identifying an offset between GSCNs corresponding to the first SSB and the second SSB, information identifying a GSCN of the second SSB, and/or the like. As shown, the UE 120 may receive the first SSB as part of a scan (e.g., a frequency scan, a band scan, and/or the like). For example, the UE 120 may acquire the first SSB.

As shown by reference number 430, the UE 120 may determine a channel number of the second SSB. For example, the UE 120 may determine the channel number of the second SSB based at least in part on the information identifying the CD SSB. As shown by reference number 440, the UE 120 may determine whether to attempt acquisition of the second SSB at an elevated priority level. As used herein, attempting acquisition of an SSB at an elevated priority level may refer to attempting to acquire the SSB at a next possible occasion, attempting to acquire the SSB out-of-order from a linear scan order, attempting to acquire the SSB at an increased frequency, and/or the like.

In some aspects, the UE 120 may determine whether to attempt acquisition of the second SSB based at least in part on a timer value. For example, the UE 120 may skip one or more channels between a channel associated with the first SSB and a channel associated with the second SSB for a particular length of time (e.g., which may be defined as a variable T_inter_GSCN_skip) across search attempts. In some aspects, the UE 120 may determine whether to attempt acquisition of the second SSB based at least in part on a number of times a redirection to a CD SSB has been followed without finding a CD SSB on the target channel. In some aspects, this determination may be based at least in part on a mobile network associated with BS 110. In some aspects, the UE 120 may determine whether to attempt acquisition of the second SSB based at least in part on a number of scans performed since a last band scan when acquisition of a CD SSB was attempted at an elevated priority level. Thus, the UE 120 may selectively attempt acquisition of the CD SSB based at least in part on one or more conditions, which provides more graceful handling of network misconfigurations, prevents loops associated with prioritizing CD SSBs, and provides a more complete band scan result.

In some aspects, the UE 120 may determine whether to attempt acquisition of the second SSB based at least in part on any one or more of: a cell associated with the UE 120, the first SSB, or the second SSB; a tracking area indicator or routing area indicator associated with the UE 120, the first SSB, or the second SSB; a public land mobile network (PLMN) associated with the UE 120, the first SSB, or the second SSB; a geographical area associated with the UE 120, the first SSB, or the second SSB (e.g., based at least in part on an NR or LTE neighbor cell, a Global Positioning System (GPS) signal, Wi-Fi information, a Bluetooth beacon, and/or the like); and/or the like. For example, if the UE 120 has previously detected a network misconfiguration in connection with an indicator of a CD SSB for a particular cell, tracking area indicator, routing area indicator, PLMN, and/or geographical area, the UE 120 may subsequently disregard another indicator associated with the particular cell, tracking area indicator, routing area indicator, PLMN, and/or geographical area. Thus, the UE 120 may reduce reliance on inaccurate indicators of CD SSBs.

As shown by reference number 450, the UE 120 may attempt acquisition of the second SSB at the elevated priority level based at least in part on the channel number. For a more detailed description of attempting acquisition of the second SSB at the elevated priority level, refer to the description accompanying FIG. 5.

As shown by reference number 460, in some cases, the UE 120 may identify a network misconfiguration based at least in part on failing to acquire the CD SSB. For example, the UE 120 may determine that the information identifying the CD SSB is erroneous based at least in part on failing to acquire the CD SSB.

As shown by reference number 470, in some aspects, the UE 120 may continue the scan. For example, in a case when the UE 120 does not acquire the CD SSB or identifies a network misconfiguration, the UE 120 may continue the scan. More particularly, if the UE 120 does not acquire the CD SSB at the channel associated with the CD SSB after a particular number of attempts (e.g., a particular number of attempted redirections to the channel associated with the CD SSB, a particular number of attempted redirections to channels purported to be associated with CD SSBs, and/or the like), then the UE 120 may determine to attempt to acquire CD SSBs on GSCNs between channels associated with the first SSB and the second SSB, or may continue the scan after the second SSB. In some aspects, if the UE 120 acquires a CD SSB at a GSCN different from the one advertised by BS 110, then UE 120 may identify the network misconfiguration. In other words, the UE 120 may identify a network misconfiguration based at least in part on failing to acquire a CD SSB at a specified channel and/or based at least in part on acquiring a CD SSB at a location other than the specified channel.

In this way, the UE 120 may prioritize acquisition of a CD SSB, thereby reducing scanning time associated with acquiring a cell. Furthermore, the UE 120 may identify and/or mitigate the impact of network misconfigurations, thereby reducing error states and/or latency associated with such misconfigurations.

As indicated above, FIG. 4 is provided as an example. Other examples may differ from what is described in connection with FIG. 4.

Figure 5:
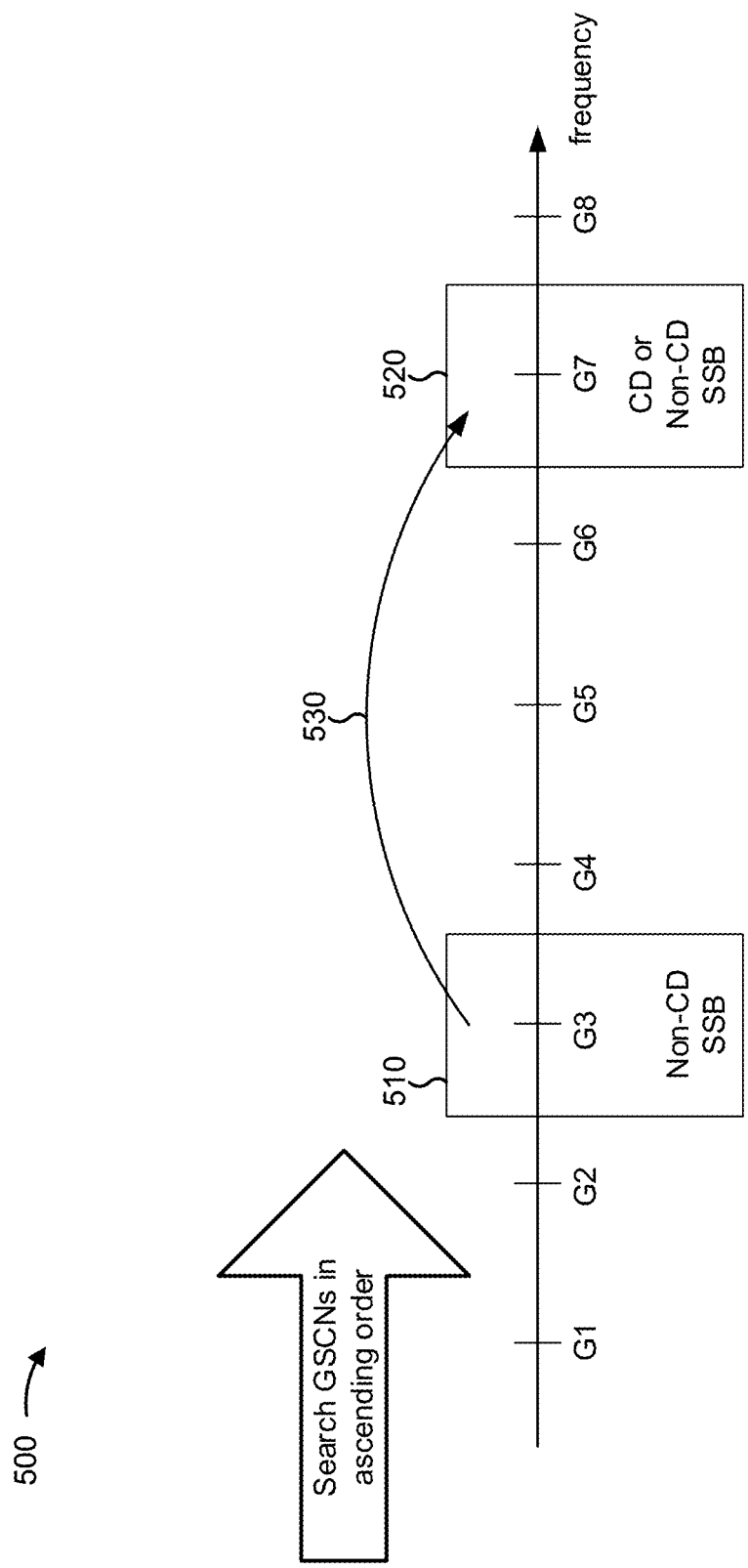
FIG. 5 is a diagram illustrating an example of attempting to acquire a CD SSB at an elevated priority level, in accordance with various aspects of the present disclosure.

FIG. 5 is a diagram illustrating an example 500 of attempting to acquire a CD SSB at an elevated priority level, in accordance with various aspects of the present disclosure. As shown in FIG. 5, a UE 120 may scan a set of channels associated with respective GSCNs G1 through G8 in an ascending order (e.g., from G1 to G8).

As shown by reference number 510, the UE 120 may acquire a first SSB that is a non-CD SSB at GSCN G3. In this example, the first SSB indicates that a second SSB at GSCN G7, shown by reference number 520, is a CD SSB. Here, the SSB associated with GSCN G7 is shown as "CD or Non-CD SSB" since there may or may not be a network misconfiguration associated with GSCN G7.

As shown by reference number 530, the UE 120 may attempt to acquire the CD SSB at an elevated priority level (e.g., relative to a baseline priority level or a linear or progressive scan) based at least in part on the first SSB indicating that the second SSB is a CD SSB. For example, the UE 120 may skip acquisition on at least one channel between a channel corresponding to the first SSB (e.g., a first channel number associated with the first SSB) and a channel corresponding to the second SSB (e.g., a second channel number associated with the second SSB). In some cases, the UE 120 may successfully acquire the CD SSB. In such a case, the UE 120 may camp on a cell identified by the CD SSB. In some cases, the UE 120 may not successfully acquire the CD SSB (e.g., due to a signal for the CD SSB being too weak, due to the network being misconfigured, etc.). In such a case, the UE 120 may perform the operations described in connection with FIGS. 6 and/or 7.

As indicated above, FIG. 5 is provided as an example. Other examples may differ from what is described in connection with FIG. 5.

Figure 6:
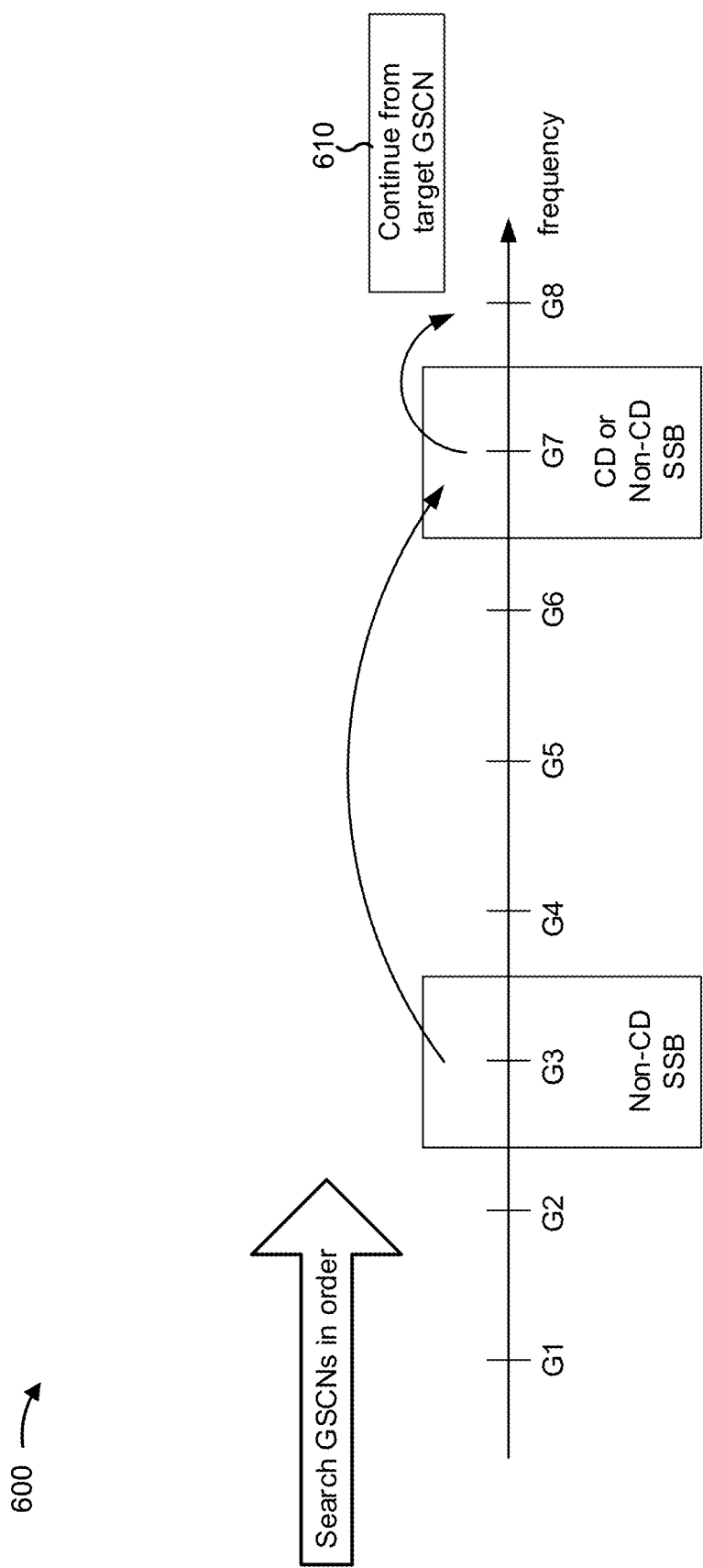
FIGS. 6 and 7 are diagrams illustrating examples of continuing a scan from a second SSB and from a first SSB, respectively, in accordance with various aspects of the present disclosure.
Figure 7:
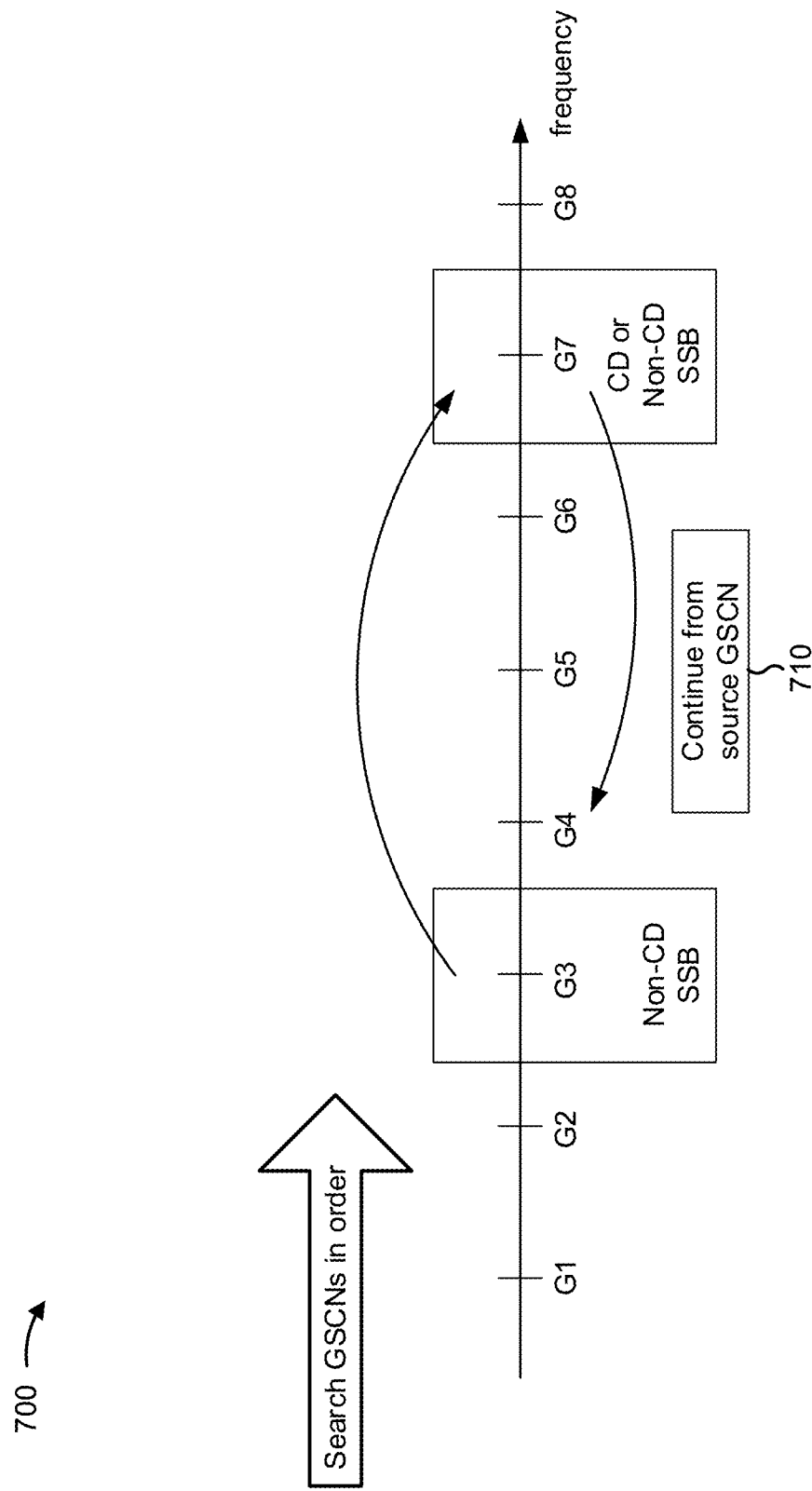

FIGS. 6 and 7 are diagrams illustrating examples 600 and 700 of continuing a scan from a second SSB and from a first SSB, respectively, in accordance with various aspects of the present disclosure. Examples 600 and 700 are examples wherein a UE 120 is to continue a scan after successfully acquiring a CD SSB at a particular GSCN, or after failing to acquire a CD SSB at the particular GSCN. For example, the UE 120 may perform the operations described in connection with FIGS. 6 and/or 7 based at least in part on successfully acquiring a CD SSB (e.g., in order to acquire one or more other CD SSBs) or based at least in part on failing to acquire a CD SSB (e.g., in order to acquire at least one CD SSB). As shown by reference number 610 of FIG. 6, in a first case, the UE 120 may continue the scan from a target GSCN associated with the second SSB. For example, the UE 120 may scan a next channel, associated with a next GSCN, after a channel associated with the second SSB. As shown by reference number 710 of FIG. 7, in a second case, the UE 120 may continue the scan from a channel associated with a next GSCN after a source GSCN associated with the first SSB. The approach shown by example 600 may lead to a quicker acquisition when the CD SSB is actually located above the channel associated with the second SSB whereas the approach shown by example 700 may lead to a quicker acquisition when the CD SSB is actually located between the channel associated with the first SSB and the channel associated with the second SSB.

As indicated above, FIGS. 6 and 7 are provided as examples. Other examples may differ from what is described in connection with FIGS. 6 and 7.

Figure 8:
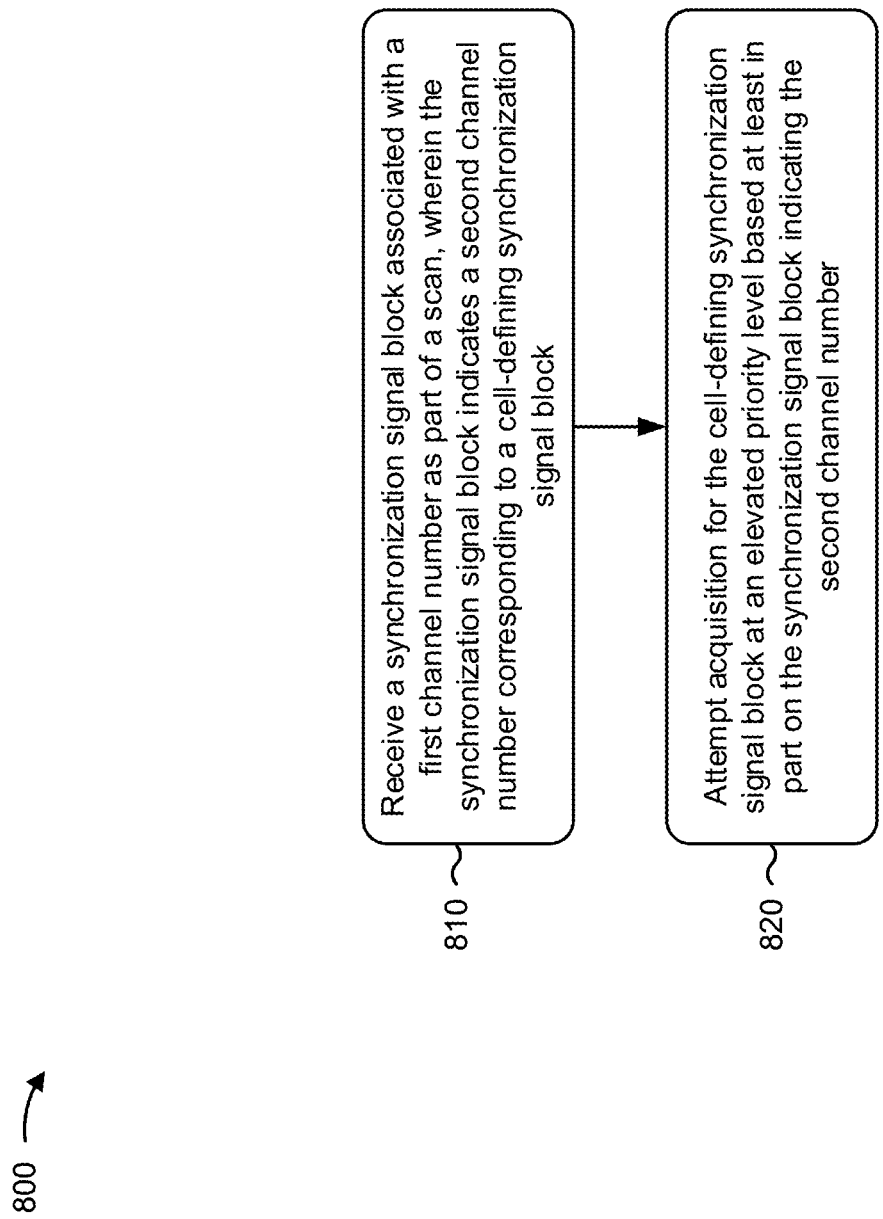
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a user equipment (e.g., user equipment 120 and/or the like) performs operations associated with cell selection.

As shown in FIG. 8, in some aspects, process 800 may include receiving a synchronization signal block associated with a first channel number as part of a scan, wherein the synchronization signal block indicates a second channel number corresponding to a cell-defining synchronization signal block (block 810). For example, the user equipment (e.g., using antenna 252, DEMOD 254, MIMO detector 256, receive processor 258, controller/processor 280, and/or the like) may receive a synchronization signal block associated with a first channel number as part of a scan, as described above. In some aspects, the synchronization signal block indicates a second channel number corresponding to a cell-defining synchronization signal block.

As further shown in FIG. 8, in some aspects, process 800 may include attempting acquisition for the cell-defining synchronization signal block at an elevated priority level based at least in part on the synchronization signal block indicating the second channel number (block 820). For example, the user equipment (e.g., using receive processor 258, transmit processor 264, controller/processor 280, memory 282, and/or the like) may attempt acquisition for the cell-defining synchronization signal block at an elevated priority level based at least in part on the synchronization signal block indicating the second channel number, as described above.

Process 800 may include additional aspects, such as any single implementation or any combination of aspects described below and/or in connection with one or more other processes described elsewhere herein.

In a first aspect, attempting the acquisition for the cell-defining synchronization signal block at the elevated priority level comprises skipping acquisition on at least one channel between a channel corresponding to the first channel number and a channel corresponding to the second channel number.

In a second aspect, alone or in combination with the first aspect, attempting the acquisition for the cell-defining synchronization signal block at the elevated priority level is based at least in part on a timer.

In a third aspect, alone or in combination with the first aspect and/or the second aspect, attempting the acquisition for the cell-defining synchronization signal block at the elevated priority level is based at least in part on a number of times that the UE has previously scanned for another cell-defining synchronization signal block at an elevated priority level without identifying the other cell-defining synchronization signal block.

In a fourth aspect, alone or in combination with any one or more of the first through third aspects, attempting the acquisition for the cell-defining synchronization signal block at the elevated priority level is based at least in part on a number of scans performed since a previous scan was performed at the elevated priority level without identifying the other cell-defining synchronization signal block.

In a fifth aspect, alone or in combination with any one or more of the first through fourth aspects, the UE may selectively continue the scan at a next channel number after the first channel number, or at a next channel number after the second channel number, based at least in part on a timer.

In a sixth aspect, alone or in combination with any one or more of the first through fifth aspects, the UE may selectively continue the scan at a next channel number after the first channel number, or at a next channel number after the second channel number, based at least in part on a number of scans performed since a previous scan was continued from a channel number associated with another cell-defining synchronization signal block.

In a seventh aspect, alone or in combination with any one or more of the first through sixth aspects, the UE may determine that the acquisition is to be attempted at the elevated priority level.

In an eighth aspect, alone or in combination with any one or more of the first through seventh aspects, determining that the acquisition is to be attempted at the elevated priority level is based at least in part on at least one of: a cell of the UE, a tracking area or routing area of the UE, a mobile network of the UE, or a geographical area of the UE.

In a ninth aspect, alone or in combination with any one or more of the first through eighth aspects, the UE may determine, after a threshold number of attempts, that the cell-defining synchronization signal block is not acquired at the second channel number; and attempt the acquisition for one or more channel numbers between the first channel number and the second channel number based at least in part on determining that the cell-defining synchronization signal block is not received at the second channel number after the threshold number of attempts.

In a tenth aspect, alone or in combination with any one or more of the first through ninth aspects, the UE may acquire the cell-defining synchronization signal block at a channel other than one associated with the second channel number, and identify a network misconfiguration based at least in part on acquiring the cell-defining synchronization signal block at the channel other than the one associated with the second channel number.

In an eleventh aspect, alone or in combination with any one or more of the first through tenth aspects, the UE may receive information identifying another channel number associated with another cell-defining synchronization signal block, and determine that acquisition of the other cell-defining synchronization signal block is not to be prioritized based at least in part on the network misconfiguration.

In a twelfth aspect, alone or in combination with any one or more of the first through eleventh aspects, the UE may perform the scan for a New Radio (NR) radio access technology (RAT), and perform a scan for another RAT, other than the NR RAT, during the scan for the NR RAT.

In a thirteenth aspect, alone or in combination with any one or more of the first through twelfth aspects, a frequency range associated with another RAT other than the NR RAT is skipped during the scan.

In a fourteenth aspect, alone or in combination with any one or more of the first through thirteenth aspects, the UE may perform the scan for multiple channel numbers in parallel. In a fifteenth aspect, alone or in combination with any one or more of the first through fourteenth aspects, the scanning order is based at least in part on a previous scan or frequencies to be scanned as part of the scan.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a synchronization signal block associated with a first channel number as part of a scan,
      wherein the synchronization signal block indicates a second channel number corresponding to a cell-defining synchronization signal block;
   attempting a first acquisition for the cell-defining synchronization signal block at an elevated priority level based at least in part on the synchronization signal block indicating the second channel number and based at least in part on a timer,
      wherein attempting the first acquisition for the cell-defining synchronization signal block at the elevated priority level based at least in on part on the timer comprises:
         skipping one or more channels between a first channel and a second channel for a length of time across search attempts,
            wherein the first channel corresponds to the first channel number and the second channel corresponds to the second channel number; and
   attempting, based at least in part on the cell-defining synchronization signal block not being acquired after skipping the one or more channels between the first channel and the second channel and based at least in part on the timer, a second acquisition for the cell-defining synchronization signal block on the one or more channels between the first channel and the second channel.

2. The method of claim 1, wherein attempting the first acquisition for the cell-defining synchronization signal block at the elevated priority level is based at least in part on a number of times that the UE has previously scanned for another cell-defining synchronization signal block at the elevated priority level without identifying the other cell-defining synchronization signal block.

3. The method of claim 1, wherein attempting the first acquisition for the cell-defining synchronization signal block at the elevated priority level is based at least in part on a number of scans performed since a previous scan was performed at the elevated priority level without identifying another cell-defining synchronization signal block.

4. The method of claim 1, wherein attempting the second acquisition for the cell-defining synchronization signal block on the one or more channels between the first channel and the second channel comprises:
   selectively continuing the scan at a next channel after the first channel based at least in part on the timer.

5. The method of claim 1, wherein attempting the second acquisition for the cell-defining synchronization signal block on the one or more channels between the first channel and the second channel comprises:
   selectively continuing the scan at a next channel after the first channel based at least in part on a number of scans performed since a previous scan was continued from a channel associated with another cell-defining synchronization signal block.

6. The method of claim 1, further comprising:
   determining that the first acquisition is to be attempted at the elevated priority level.

7. The method of claim 6, wherein determining that the first acquisition is to be attempted at the elevated priority level is based at least in part on at least one of:
   a cell of the UE,
   a tracking area or routing area of the UE,
   a mobile network of the UE, or
   a geographical area of the UE.

8. The method of claim 1, further comprising:
   determining, after a threshold number of attempts, that the cell-defining synchronization signal block is not acquired at the second channel; and
   wherein attempting the second acquisition for the cell-defining synchronization signal block on the one or more channels between the first channel and the second channel comprises:

attempting the second acquisition for the cell-defining synchronization signal block on the one or more channels between the first channel and the second channel based at least in part on determining that the cell-defining synchronization signal block is not received at the second channel after the threshold number of attempts.

9. The method of claim 1, further comprising:
acquiring the cell-defining synchronization signal block at a channel other than ene the second channel; and
identifying a network misconfiguration based at least in part on acquiring the cell-defining synchronization signal block at the channel other than the second channel.

10. The method of claim 9, further comprising:
receiving information identifying another channel number associated with another cell-defining synchronization signal block; and
determining that acquisition of the other cell-defining synchronization signal block is not to be prioritized based at least in part on the network misconfiguration.

11. The method of claim 1, further comprising:
performing the scan for a New Radio (NR) radio access technology (RAT); and
performing a scan for another RAT, other than the NR RAT, during the scan for the NR RAT.

12. The method of claim 1, further comprising:
performing the scan for a New Radio (NR) radio access technology (RAT), wherein a frequency range associated with another RAT other than the NR RAT is skipped during the scan.

13. The method of claim 1, further comprising:
performing the scan for multiple channel numbers in parallel.

14. The method of claim 1, further comprising:
performing the scan based at least in part on a scanning order, wherein the scanning order is based at least in part on a previous scan or frequencies to be scanned as part of the scan.

15. A user equipment (UE) for wireless communication, comprising:
a memory; and
one or more processors coupled to the memory, the memory and the one or more processors configured to:
receive a synchronization signal block associated with a first channel number as part of a scan,
wherein the synchronization signal block indicates a second channel number corresponding to a cell-defining synchronization signal block;
attempt a first acquisition for the cell-defining synchronization signal block at an elevated priority level based at least in part on the synchronization signal block indicating the second channel number and based at least in part on a timer,
wherein the one or more processors, when attempting the first acquisition for the cell-defining synchronization signal block at the elevated priority level based at least in on part on the timer, are configured to:
skip one or more channels between a first channel and a second channel for a length of time across search attempts,
wherein the first channel corresponds to the first channel number and the second channel corresponds to the second channel number; and
attempt, based at least in part on the cell-defining synchronization signal block not being acquired after skipping the one or more channels between the first channel and the second channel and based at least in part on the timer, a second acquisition for the cell-defining synchronization signal block on the one or more channels between the first channel and the second channel.

16. The UE of claim 15, wherein the one or more processors, when attempting the second acquisition for the cell-defining synchronization signal block on the one or more channels between the first channel and the second channel, are configured to:
selectively continue the scan at a next channel after the first channel based at least in part on the timer.

17. The UE of claim 15, wherein the one or more processors, when attempting the second acquisition for the cell-defining synchronization signal block on the one or more channels between the first channel and the second channel, are configured to:
selectively continue the scan at a next channel after the first channel based at least in part on a number of scans performed since a previous scan was continued from a channel associated with another cell-defining synchronization signal block without identifying the other cell-defining synchronization signal block.

18. The UE of claim 15, wherein the one or more processors are further configured to:
determine that the scan is to be performed at the elevated priority level.

19. The UE of claim 18, wherein the determination that the scan is to be performed at the elevated priority level is based at least in part on at least one of:
a cell of the UE,
a tracking area or routing area of the UE,
a mobile network of the UE, or
a geographical area of the UE.

20. The UE of claim 15, wherein the one or more processors are further configured to:
determine, after a threshold number of attempts, that the cell-defining synchronization signal block is not acquired at the second channel; and
perform a scan for the one or more channels between the first channel and the second channel based at least in part on determining that the cell-defining synchronization signal block is not received at the second channel after the threshold number of attempts.

21. An apparatus for wireless communication, comprising:
means for receiving a synchronization signal block associated with a first channel number as part of a scan,
wherein the synchronization signal block indicates a second channel number corresponding to a cell-defining synchronization signal block;
means for attempting a first acquisition for the cell-defining synchronization signal block at an elevated priority level based at least in part on the synchronization signal block indicating the second channel number and based at least in part on a timer,
wherein the means for attempting the first acquisition for the cell-defining synchronization signal block at the elevated priority level based at least in on part on the timer comprises:
means for skipping one or more channels between a first channel and a second channel for a length of time across search attempts,
wherein the first channel corresponds to the first channel number and the second channel corresponds to the second channel number; and means for attempting, based at least in part on the cell-defining synchronization signal block not being acquired after skipping the one or more channels between the first channel and the second channel and based at least in part on the timer, a second acquisition for the cell-defining synchronization signal block on the one or more channels between the first channel and the second channel.

22. The apparatus of claim 21, wherein the means for attempting the second acquisition for the cell-defining synchronization signal block on the one or more channels between the first channel and the second channel comprises:
means for selectively continuing the scan at a next channel after the first channel based at least in part on the timer.

23. The apparatus of claim 21, wherein the means for attempting the second acquisition for the cell-defining synchronization signal block on the one or more channels between the first channel and the second channel comprises:
means for selectively continuing the scan at a next channel after the first channel based at least in part on a number of scans performed since a previous scan was continued from a channel associated with another cell-defining synchronization signal block.

24. The apparatus of claim 21, further comprising:
means for determining that the scan is to be performed at the elevated priority level.

25. The apparatus of claim 21, further comprising:
means for determining, after a threshold number of attempts, that the cell-defining synchronization signal block is not received at the second channel; and
wherein the means for attempting the second acquisition for the cell-defining synchronization signal block on the one or more channels between the first channel and the second channel comprises:
means for performing the scan for the one or more channels between the first channel and the second channel based at least in part on determining that the cell-defining synchronization signal block is not received at the second channel after the threshold number of attempts.

26. A non-transitory computer-readable medium storing one or more instructions for wireless communication, the one or more instructions comprising:
one or more instructions that, when executed by one or more processors of a user equipment (UE), cause the one or more processors to:
receive a synchronization signal block associated with a first channel number as part of a scan,
wherein the synchronization signal block indicates a second channel number corresponding to a cell-defining synchronization signal block;
attempt a first acquisition for the cell-defining synchronization signal block at an elevated priority level based at least in part on the synchronization signal block indicating the second channel number and based at least in part on a timer,
wherein the one or more instructions, that cause the one or more processors to attempt the first acquisition for the cell-defining synchronization signal block at the elevated priority level based at least in on part on the timer, cause the one or more processors to:
skip one or more channels between a first channel and a second channel for a length of time across search attempts,
wherein the first channel corresponds to the first channel number and the second channel corresponds to the second channel number; and
attempt, based at least in part on the cell-defining synchronization signal block not being acquired after skipping the one or more channels between the first channel and the second channel and based at least in part on the timer, a second acquisition for the cell-defining synchronization signal block on the one or more channels between the first channel and the second channel.

27. The non-transitory computer-readable medium of claim 26, wherein the one or more instructions, that cause the one or more processors to attempt the first acquisition for the cell-defining synchronization signal block at the elevated priority level, cause the one or more processors to:
attempt the first acquisition for the cell-defining synchronization signal block at the elevated priority level based at least in part on a number of times that the UE has previously scanned for another cell-defining synchronization signal block at the elevated priority level without identifying the other cell-defining synchronization signal block.

28. The non-transitory computer-readable medium of claim 26, wherein the one or more instructions, that cause the one or more processors to attempt the first acquisition for the cell-defining synchronization signal block at the elevated priority level, cause the one or more processors to:
attempt the first acquisition for the cell-defining synchronization signal block at the elevated priority level based at least in part on a number of scans performed since a previous scan was performed at the elevated priority level without identifying another cell-defining synchronization signal block.

29. The non-transitory computer-readable medium of claim 26, wherein the one or more instructions, that cause the one or more processors to attempt the second acquisition for the cell-defining synchronization signal block on the one or more channels between the first channel and the second channel, cause the one or more processors to:
selectively continue the scan at a next channel after the first channel based at least in part on a number of scans performed since a previous scan was continued from a channel associated with another cell-defining synchronization signal block without identifying the other cell-defining synchronization signal block.

30. The non-transitory computer-readable medium of claim 26, wherein the one or more instructions, when executed by the one or more processors, further cause the one or more processors to:
determine, after a threshold number of attempts, that the cell-defining synchronization signal block is not acquired at the second channel number; and
wherein the one or more instructions, that cause the one or more processors to attempt the second acquisition for the cell-defining synchronization signal block on the one or more channels between the first channel and the second channel, cause the one or more processors to:
perform a scan for the one or more channels between the first channel and the second channel based at least in part on determining that the cell-defining synchronization signal block is not received at the second channel number after the threshold number of attempts.

* * * * *